United States Patent
Gupta et al.

(10) Patent No.: US 7,224,487 B2
(45) Date of Patent: May 29, 2007

(54) INK REDUCTION ERROR DIFFUSION

(75) Inventors: Maya Rani Gupta, Menlo Park, CA (US); Kathrin Berkner, Menlo Park, CA (US); Martin Boliek, San Francisco, CA (US)

(73) Assignee: Ricoh Co., Ltd., Tokyo (JP)

( * ) Notice: Subject to any disclaimer, the term of this patent is extended or adjusted under 35 U.S.C. 154(b) by 974 days.

(21) Appl. No.: 10/350,121

(22) Filed: Jan. 22, 2003

(65) Prior Publication Data

US 2004/0141194 A1    Jul. 22, 2004

(51) Int. Cl.
*H04N 1/52* (2006.01)
*H04N 1/60* (2006.01)

(52) U.S. Cl. ............... 358/3.05; 358/3.26; 358/534

(58) Field of Classification Search ...... 358/3.03–3.06, 358/534–536, 1.9; 382/252
See application file for complete search history.

(56) References Cited

U.S. PATENT DOCUMENTS

| | | | | |
|---|---|---|---|---|
| 5,333,243 A | * | 7/1994 | Best et al. | 358/1.9 |
| 5,402,245 A | * | 3/1995 | Motta et al. | 358/1.9 |
| 5,473,446 A | * | 12/1995 | Perumal et al. | 358/534 |
| 5,592,592 A | * | 1/1997 | Shu | 358/1.9 |
| 5,621,545 A | * | 4/1997 | Motta et al. | 358/3.03 |
| 6,313,925 B1 | * | 11/2001 | Decker et al. | 358/1.9 |
| 6,747,758 B1 | * | 6/2004 | Nishida | 358/1.9 |
| 7,079,289 B2 | * | 7/2006 | Loce et al. | 358/3.03 |

* cited by examiner

*Primary Examiner*—Scott A. Rogers
(74) *Attorney, Agent, or Firm*—Blakely, Sokoloff, Taylor & Zafman LLP

(57) ABSTRACT

A method and apparatus for performing ink reduction error diffusion are described. In one embodiment, the method comprises performing vector error diffusion and mapping anchors to printing colors, where performing vector error diffusion includes quantizing each input pixel value to a closest anchor in an anchor set, calculating errors based on differences between the input pixel values and the anchors, and performing error filtering based on calculated errors.

49 Claims, 11 Drawing Sheets

THE M DOT ON TOP OF THE K DOT IS REMOVED BY WCR

INK REDUCTION ERROR DIFFUSION

TECHNICAL FIELD

The present invention relates to the field of printing; more particularly, the present invention relates to techniques for reducing the amount of ink or toner used to print a color document using halftoning.

BACKGROUND

Ink or toner can be a significant cost over the lifetime of a printer or copier. Therefore, using less ink results in overall cost savings. In general, the amount of ink used contributes significantly to the cost of printing the page. If each printed page uses less ink, then that ink savings translates into direct cost savings. Also, environmental benefits may come in the paper recycling process where use of less ink can result in needing fewer toxic chemicals. Furthermore, the paper recycling process is a hydrodynamic process, and thus less ink on paper may result in less water usage and less power to pump the process.

While ink reduction is a desirable result, current color printers do not efficiently use ink. Methods for reducing ink usage includes draft mode technology, pre-halftoning technologies, and halftoning algorithms that reduce ink while maintaining image quality. With respect to the draft mode technology, some current printers provide a 'draft' option that reduces ink by reducing image quality. For example, a draft document may be printed by only printing alternate dots of an image, essentially halving the brightness of the 8 bit C, M, Y and K values before halftoning, or decreasing the saturation of an image before halftoning. Because draft printing reduces the quality of the document, this technique provides only limited usefulness in reducing the quantity of ink used by a color printer or copier.

Another set of technologies changes or limits the 8-bit data before the halftoning. See for example, U.S. Pat. No. 6,313,925, entitled "System, Method, and Program for Saving Toner/Ink in a Color Printer Without Sacrificing Image Quality," issued Nov. 6, 2001 to Decker et al. Special undercolor removal functions are sometimes used.

Previous work has modified error diffusion to compensate for dot gain. See, for example, Henry Kang, *Digital Color Halftoning*, SPIE Press, 2001 and Joseph Shu, "Error Diffusion With Ink Reduction for High Quality and High Resolution Ink Jet Printing," IEEE International Conference on Image Processing, 1995. Shu refers to his algorithm as "Error diffusion with ink reduction." He states that he compensates for the dot gain in order to reduce ink to prevent ink overflow on the ink jet media and to reduce worm-artifacts. Shu's work also appears in patent form. See U.S. Pat. No. 5,592,592, entitled "Method and Apparatus for Minimizing Artifacts in Images Produced by Error Diffusion Halftoning Utilizing Ink Reduction Processing," issued Jan. 7, 1997 to Shu.

Another relevant body of technologies is the set of halftoning algorithms that do not allow K overprinting. There are many dither methods. For example, see U.S. Pat. No. 5,473,446, entitled "Color Digital Halftoning Using Black and Secondary Color Replacement and Color Vector Dithering," issued Dec. 5, 1995 to Perumal, et al.

U.S. Pat. No. 5,333,243, entitled "Method for Forming Color Images Using a Hue-Plus-Gray Color Model and Error Diffusion," issued Jul. 26, 1994 to Best et al., describes a novel error diffusion method in which only one color (R, G, B, C, M, Y, K, W) is printed at a time. This disallows the possibility of printing K on top of a color. The system decides which color to print by noting which color has the current largest error. Error is passed as in normal error diffusion. Such methods require special undercolor removal or limitations on the input or else the error will overflow. For example, the CMYK input value (255, 0, 0, 50) would cause this method to have increasingly large errors.

In U.S. Pat. No. 5,402,245, entitled "Bi-level digital color printer system exhibiting improved undercolor removal and error diffusion procedures," issued Mar. 28, 1995 to Motta et al., an error diffusion algorithm is described in which a decision is first made to print K or not based on whether the input k value is the largest input value and if it is greater than the error diffusion threshold. If it is decided to print K, then no other colors (C, M, Y) are considered. Again, special undercolor removal or limitations on the input are necessary to ensure that the error does not overflow. For example, the CMYK input color (50, 0, 0, 255) would cause this method to have increasingly large errors.

Work by Motta and Dispoto includes the idea of a mapping between the quantizer and the output halftone signal. In their work the error diffusion steps of quantizing, error calculation, and error distribution happen in one space (such as CIELab, or RGB space) and then the output from the quantizer is mapped to an appropriate color in the printing device space. See U.S. Pat. No. 5,621,545, entitled "Image production using color error diffusion," issued Apr. 15, 1997 to Motta et al. However, this patent only describes mapping to CMY space.

SUMMARY

A method and apparatus for performing ink reduction error diffusion are described. In one embodiment, the method comprises performing vector error diffusion and mapping anchors to printing colors, where performing vector error diffusion includes quantizing each input pixel value to a closest anchor in an anchor set, calculating errors based on differences between the input pixel values and the anchors, and performing error filtering based on calculated errors.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
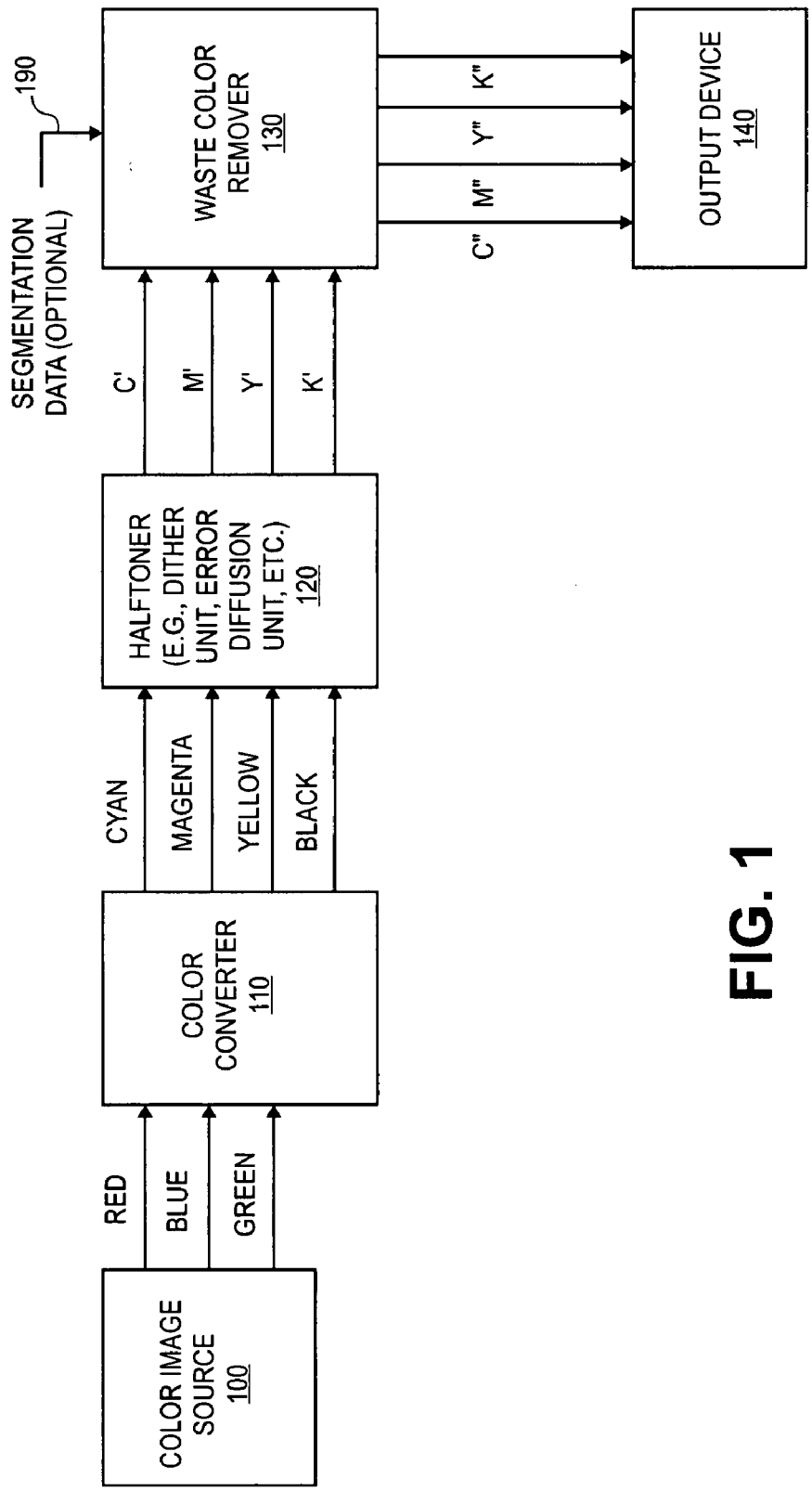
FIG. 1 is a block diagram of one embodiment of components to provide ink reduction.

Color digital halftoning is a key technology for reproducing color digital images on paper. A color digital halftoning technique is described that takes advantage of the spatial integration in the Human Visual System to create the visual perception of a great number of colors with a palette of only a few. The color digital halftoning technique is a vector form of error diffusion. This vector form of error diffusion has a number of goals that various embodiments of the present invention may satisfy, including, but not limited to, reducing the ink or toner used in the printing process, and maintaining or improving the image quality for such features as graininess, color fidelity, robustness to misregistration, and/or other quality measures.

The choice of halftoning algorithm and parameters affects the amount of ink used. Different techniques are described herein that call for fewer digital dots in the halftone signal (before the physical printing process). Other possible benefits to reducing actual ink usage include faster paper drying, less ink on the paper for ink jet processing, and environmental benefits.

Overview

In conventional halftoning, C or M or Y toner dots are often printed on top of K (black) toner dots. This is called overprinting. The resulting color of printing a color patch and a K (black) patch on top of each other is a color almost indistinguishable from printing K alone. This overprinting often adds little to the image quality. In one embodiment, this overprinting is reduced, possibly to reduce ink usage. This is referred to herein as waste color removal (WCR) and, in one embodiment, the colored dots that are digitally overprinted on K dots are removed as a post-halftoning step.

One embodiment of the ink reduction technique described herein uses Vector Error Diffusion (VED). VED halftones all four components (CMYK) at the same time, thereby allowing overprinting of the colored dots to be controlled. In conventional VED for 4 ink color printing, each input pixel is quantized to one of the 16 colors printable by combining the 4 inks.

In one embodiment, WCR is performed, and also the VED error calculation operation is changed to imitate the assumption that any color on top of K appears the same as K.

Glossary

| | |
|---|---|
| anchor | Any value that the quantizer can quantize to. |
| C | Cyan color (e.g., ink, digital dot, etc.). In one embodiment, C is a multi-bit color value or ink value. |
| digital domain | All image processing after the analog sensors and before the physical rendering. |
| digital dot | The 1 bit color value for the C, Y, M, or K color planes in the digital domain. This is before deposition by a physical printer. |
| ink | May be used to mean ink, toner, wax, dye, phosphor, other consumable colorant, etc. |
| graininess | Visible random noise pattern in smooth parts of an image, granularity. |
| K | Black color (e.g., ink, digital dot, etc.). In one embodiment, K is a multi-bit color value or ink value. |
| M | Magenta color (e.g., ink, digital dot, etc.). In one embodiment, M is a multi-bit color value or ink value. |
| palette | A list of colors, usually a subset of all possible digital colors but the entirety of possible display colors. |
| Plane by plane the error diffusion | Error diffusion is performed on each color plane without respect to other color planes. |
| UCR | Under Color Removal, a pre-halftoning step that converts some combination of Cyan, Magenta, and Yellow to Black. |
| VED | Color Vector Error Diffusion. All color planes are present or the halftoning for all is done with respect to the others. |
| W | White color (e.g., digital dot). The color results when no ink, toner, etc., is pinted. |
| WCR | Waste Color Removal. |
| Y | Yellow color (e.g., ink, digital dot, etc.). In one embodiment, Y is a multi-bit color value or ink value. |

In the following description, numerous details are set forth to provide a more thorough explanation of the invention. It will be apparent, however, to one skilled in the art, that the invention may be practiced without these specific details. In other instances, well-known structures and devices are shown in block diagram form, rather than in detail, in order to avoid obscuring the invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the description that follows, an input (or output) color may be represented as a four-component vector (C, M, Y, K) where C, M, Y and K are percentages or fractions of 100% ink. Thus, the color (0.8, 0.5, 0, 0) requests that the printer print 80% of cyan ink, 50% of magenta ink, and 0% of yellow or black. Alternatively, an input (or output) color can be represented as a value in a range of values. For example, in an 8-bit embodiment, (255, 0, 0, 0) requests the printer to print 100% or cyan ink and 0% of magenta, yellow and black ink. It is not a requirement that the representation being used maps directly to toners. Also, other vectors may be used having more, less, or other components such as a vector having K and some other colors such as orange and green. For example, a 6-component vector may add orange and green (C, M, Y, K, O, G).

Waste Color Removal (WCR)

FIG. 1 is a block diagram of one embodiment of components to provide ink reduction. Color image source 100 provides color image data corresponding to a color image to be printed. The color image data from color image source 100 is typically in the form of Red-Green-Blue (RGB) signals; however, any color image data in any format can be used.

In one embodiment, the RGB color data is converted to Cyan-Magenta-Yellow-Black (CMYK) color data by color converter 110 using any conversion technique known in the art. In one embodiment, color converter 110 also performs under color removal (UCR), which is a pre-halftoning process that replaces the achromatic value of C, M and Y with K. That is, UCR maps each input color to a new input color. UCR operates on the incoming pixels, e.g., the 8-bit C, M, Y and K values. For example, in one embodiment of the UCR process, the following change is made:

$K_{new} = K + \min(C, M, Y)$ and $C_{new}$ or $M_{new}$ or $Y_{new} = C$ or $M$ or $Y - \min(C, M, Y)$.

For example, an original CMYK color value (100, 30, 220, 0) becomes (70, 0,190, 30). The new color value tends to require less ink after the halftoning process.

Halftoner 120 receives the CMYK color data and generates modified C'M'Y'K' color data. In one embodiment, the input color data is 32-bit data stream (eight bits for each of C, M, Y and K) and the output color data is a 4-bit data stream (one bit for each of C', M', Y' and K'). In one embodiment, halftoner 120 comprises an error diffusion unit. Alternatively, halftoner 120 may comprise a dither unit. The error diffusion or dithering performed by halftoner 120 may be plane-by-plane or vector.

The output from halftoner 120 is processed by waste color remover 130, which analyzes the color data to determine redundant color data. For example, if multiple dots of color are intended for the same spatial position as a black dot, the non-black dots can be eliminated without compromising the output image integrity. Waste color remover 130 generates modified color image data that is provided to output device 140, which generates an image based on the modified color image data.

In one embodiment, output device 140 is a printer (either ink or laser, wax, etc.) or print engine in a digital copier that uses less ink than would otherwise be required to generate the original image. Throughout this description the term "ink" means ink, or toner, or wax. Other output devices can also be used, for example, the output image data can be stored by a storage medium for transmission or for printing at a later time.

Ink mapping maps anchors to inks as is described in more detail below.

WCR and Error Diffusion

Figure 2A:
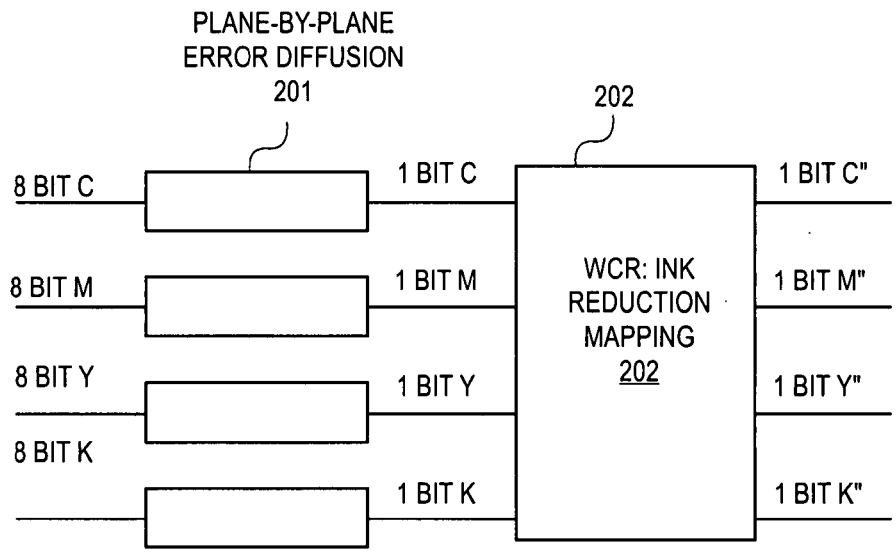
FIG. 2A is a block diagram of a waste color removal (WCR) data flow diagram that includes an error diffusion unit.

FIG. 2A is a WCR data flow diagram that includes an error diffusion unit. Referring to FIG. 2A, an error diffusion unit 201 performs plane-by-plane error diffusion to treat each color plane independently. In one embodiment, error diffusion unit 201 performs error diffusion on a vector of CMYK values. Each of the CMYK values are shown as 8-bit values in FIG. 2, although any size data may be input. The results of the plane-by-plane error diffusion are input to waste color remover 202, which performs ink reduction mapping as described above. These results include pixels where dots of K and dots of C, M or Y overlap. In the case of 8-bit CMYK values, these results are 1-bit values for each of the CMYK values that indicate whether color dots of CMYK are to be printed. Waste color remover 202 acts after halftoning to remove colored dots that digitally overlap black dots. FIG. 3 shows an example of WCR.

In one embodiment, 100% of the colored dots overlapping any K dot are removed. This is referred to herein as 100% WCR. In alternative embodiments, only a portion of the colored dots overlapping K dots are removed. This might be the case if segmentation data, such as segmentation data 190 (optional), are available as an input to WCR or based on the neighboring haltone dots. For example, in one embodiment, a colored dot overlapping a K dot is removed only if the colored dot is not isolated from other dots of its own color. Another reason not to remove all overlapping dots is to give K more depth, such as printing KC.

In the case of segmentation data, the segmentation data may indicate, for example, black versus non-black areas, photo versus text mode (of a copier for instance), or whether or not the area of the image being processed is in a region of interest or not. Obtaining such segmentation data is well-known in the art.

In one embodiment, colored dots that due to inspected misregistration are expected to overlap physical black dots may be removed.

WCR and Dither

Figure 2B:
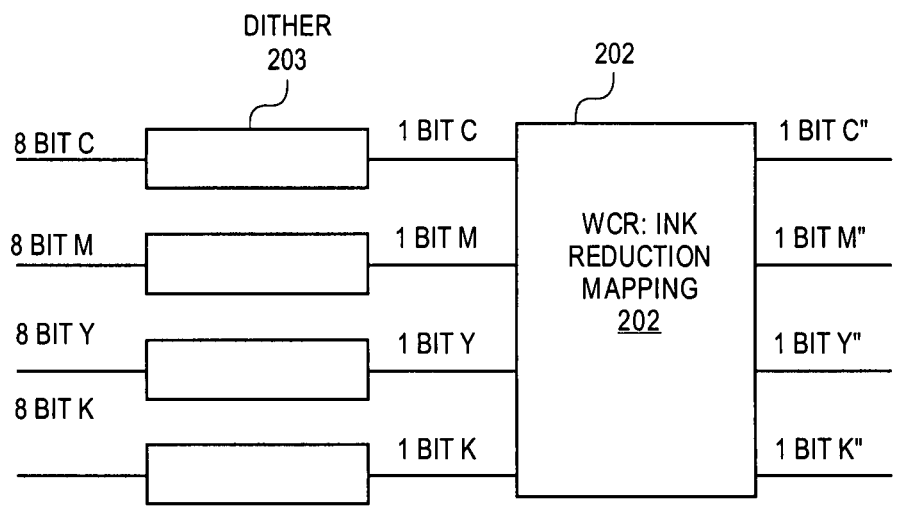
FIG. 2B is a block diagram of a WCR data flow diagram that includes a dither unit.
Figure 3:
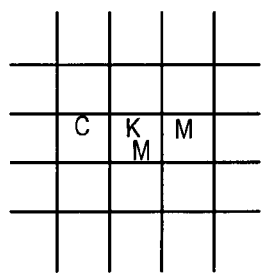
FIG. 3 shows an example of WCR.
Figure 3:
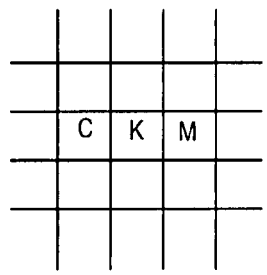

FIG. 2B is a WCR data flow diagram that includes a dither unit. Referring to FIG. 2B, a dither unit 203 performs dithering on each plane independently.

For good image quality, one way to dither before performing WCR is to use masks that are all the same size. With equal mask sizes, moire can be avoided, and good image quality after the WCR step may result. For example, conventionally the cyan and magenta mask are set at + and −30 degrees from the black mask. Often, the cyan and magenta mask are the same size.

In one embodiment, masks that are the same size at roughly 15 and 75 degree angles are used. For example, there be three such masks, mask $D_1$, mask $D_2$, and mask $D_3$. The cyan channel is dithered with mask $D_1$, the magenta channel is dithered with mask $D_2$, the yellow channel is dithered with mask $D_3$, and the black channel is dithered with mask $D_1$ or with mask $D_2$ or mask $D_3$ (one is selected to be consistent throughout an image).

One way to create masks of the same size is to start with a conventional dither mask set that already has same-size masks for cyan and magenta. New masks of the same size can be derived by shifting the values of the original cyan or magenta mask, or inverting the values (positive noise becomes negative and vice-versa), or some other operation.

In one embodiment, the cyan channel is dithered with mask $D_1$ (angled at 15 degrees), the yellow channel is dithered with equally-sized but differently angled mask $D_2$ (e.g., angled at 75 degrees), the black channel is dithered with mask $D_1$ or $D_2$ (consistently) and the magenta channel is dithered with the inverse of mask $D_1$.

In another embodiment, the cyan channel is dithered with mask $D_1$ (as above), and the black channel is dithered with the inverse of mask $D_1$. The magenta channel is dithered with mask $D_2$, and the yellow channel is dithered with the inverse of mask $D_2$.

Vector Error Diffusion (VED)

In one embodiment, halftoner 120 comprises a vector error diffusion unit. In vector error diffusion, all color planes are available at the same time for processing. Compared with plane-by-plane ED, such as is performed by error diffusion unit 201, simultaneous availability of all color planes allows more flexibility in the three processing blocks: quantization (including distance metric), error calculation, and error filtering.

Figure 4:
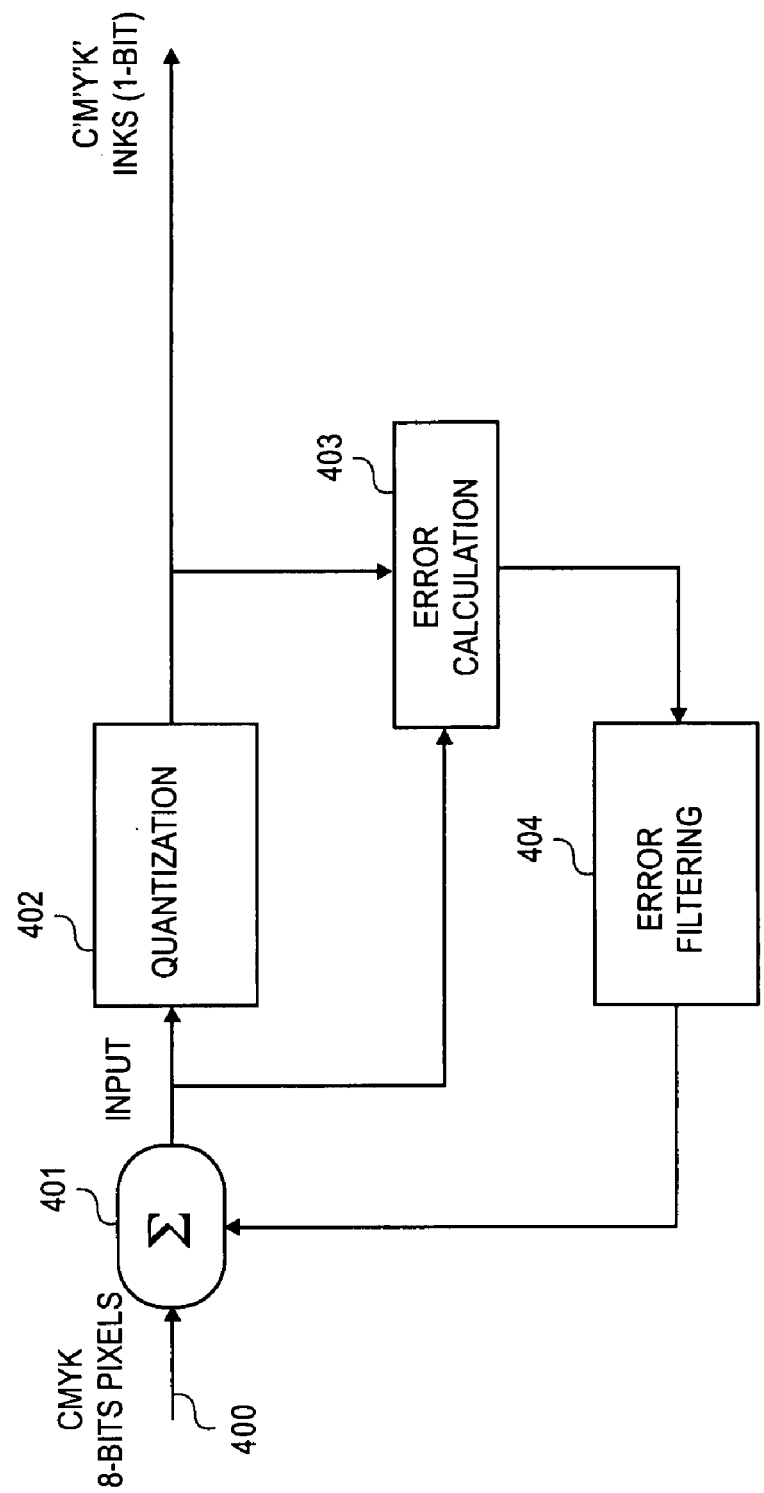
FIG. 4 is a flow diagram of one embodiment of an error diffusion unit that performs vector error diffusion.

FIG. 4 is a flow diagram of one embodiment of an error diffusion unit that performs vector error diffusion. Each of the blocks in FIG. 4 comprises processing logic that may comprise hardware (e.g., circuitry, dedicated logic, etc.), software (such as is performed by a general purpose computer system or a dedicated machine), or a combination of both.

Referring to FIG. 4, CMYK input pixels 400 are input into summation unit 401. In one embodiment, each of the CMYK pixels is 8 bits. Summation unit 401 also receives an input from error filtering unit 404 and applies error values produced as a result of performing quantization on previous input pixels to input pixels 400 in a manner well-known in the art of error diffusion.

The output of summation unit 401 is input to quantizer 402, which performs vector quantization on the input pixels, and is input to error calculation unit 403. Quantizer 402 may perform well-known color quantization technique. The output of quantizer 402 represents C'M'Y'K' inks 410 (or toners). In one embodiment, C'M'Y'K' inks 410 are 1-bit values.

The output of quantizer 402 is also input to error calculation unit 403 that calculates the difference between the output of quantizer 402 and the input to quantizer 402. This may be done on a plane-by-plane basis. The output of the error is input to error filtering unit 404 that provides error values to summation unit 404 to diffuse the error through other pixels of the CMYK input pixels.

Figure 5:
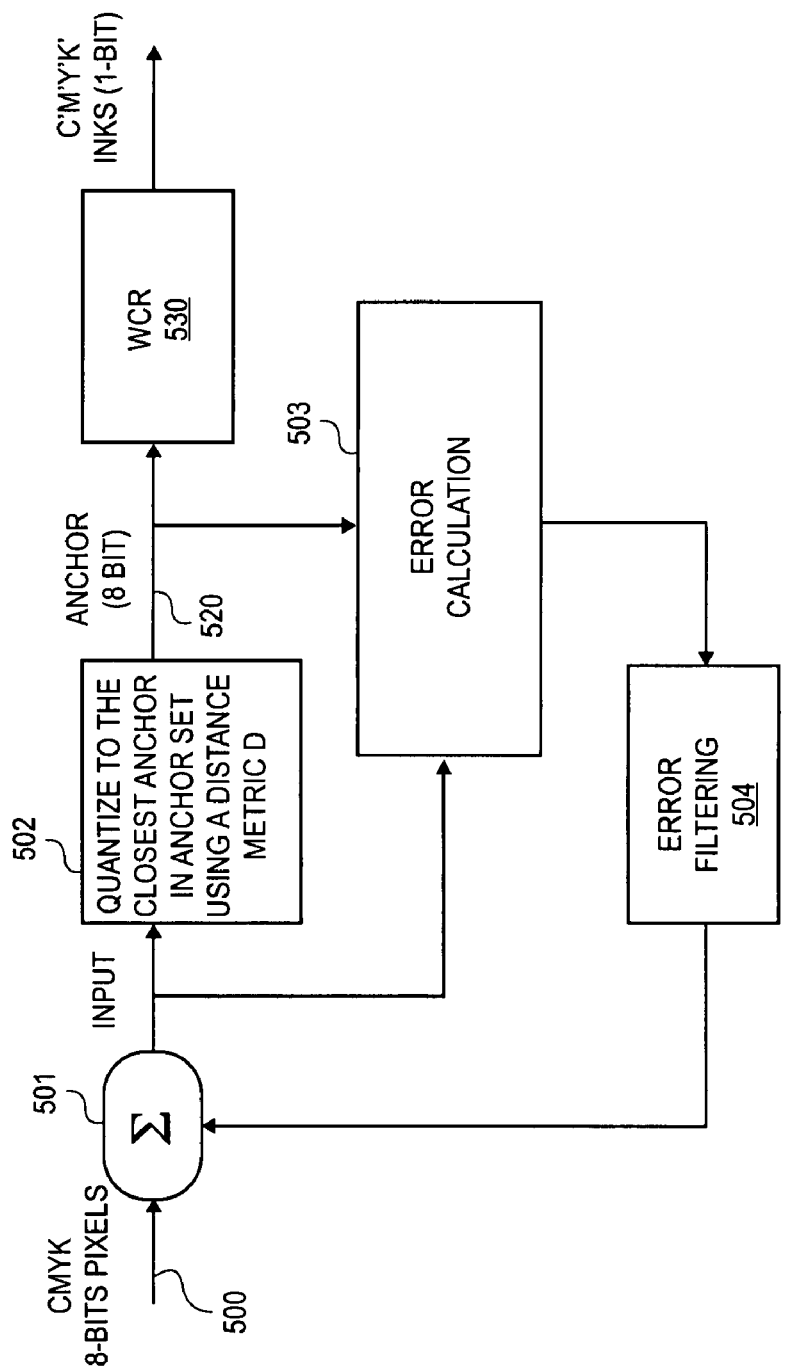
FIG. 5 is a flow diagram of one embodiment of an error diffusion unit that performs vector error diffusion followed by waste color removal.

FIG. 5 illustrates is a flow diagram of one embodiment of an error diffusion unit that performs modified vector error diffusion followed by waste color removal. Each block in FIG. 5 comprises processing logic that may comprise hardware (e.g., circuitry, dedicated logic, etc.), software (such as is performed by a general purpose computer system or a dedicated machine), or a combination of both.

Referring to FIG. 5, CMYK input pixels 500 are input into summation unit 501. In one embodiment, each of the CMYK pixels is 8 bits. Summation unit 501 also receives an input from error filtering unit 504 and applies error values produced as a result of performing quantization on previous input pixels to input pixels 500 in a manner well-known in the art of error diffusion.

The output of summation unit 501 is input to quantizer 502, which performs vector quantization on the input pixels, and is input to error calculation unit 503. Quantizer 502 quantizes the input pixels to the closest anchor in an anchor set using a distance metric d. The anchor set is the set of colors available to quantizer 502, which may be larger than the number of printable colors. In one embodiment, the anchor set includes 16 basic anchors where the anchors are the basic ink combinations (C, M, Y, K, CM, CY, CK, MY, MK, YK, CMY, CMK, CYK, MYK, CMYK, W) available for quantization, and the $L_1$ distance is chosen for the distance metric d for determining the closest ink. The $L_1$ distance may be represented as:

$$d(x, y) = \sum_i |x_i - y_i|$$

In one embodiment, the anchor is an 8 bit number. Alternatively, a quantizer might use a Euclidean ($L_2$) distance to determine the closest ink or some other well-known distance measure. The $L_2$ distance may be represented as:

$$d(x, y) = \sqrt{\Sigma(x_i - y_i)^2}$$

Note that the anchors to which the input pixels are quantized do not have to be colors that may be printed.

The anchor output 520 of quantizer 502 is input to WCR 530. WCR 530 maps the anchor output 520 to one or more inks. In one embodiment, WCR 530 maps anchors to inks according to Table 1 below.

TABLE 1

| | Ink Mapping | | | | |
| --- | --- | --- | --- | --- | --- |
| | ANCHOR | | | | |
| | C | M | Y | K | Inks |
| Basic | 0 | 0 | 0 | 0 | W |
| Colors | 255 | 0 | 0 | 0 | C' |
| | 0 | 255 | 0 | 0 | M' |
| | 0 | 0 | 255 | 0 | Y' |

TABLE 1-continued

Ink Mapping

|  | ANCHOR | | | | |
| --- | --- | --- | --- | --- | --- |
|  | C | M | Y | K | Inks |
|  | 255 | 255 | 0 | 0 | C'M' |
|  | 255 | 0 | 255 | 0 | C'Y' |
|  | 0 | 255 | 255 | 0 | M'Y' |
|  | 255 | 255 | 255 | 0 | C'M'Y' |
| Black | 0 | 0 | 0 | 255 | K' |
| Anchors - | 255 | 0 | 0 | 255 | K' |
| all map to K | 0 | 255 | 0 | 255 | K' |
|  | 255 | 255 | 0 | 255 | K' |
|  | 0 | 0 | 255 | 255 | K' |
|  | 255 | 0 | 255 | 255 | K' |
|  | 0 | 255 | 255 | 255 | K' |
|  | 255 | 255 | 255 | 255 | K' |

The outputs of WCR 530 are C'M'Y'K' inks 510. In one embodiment. C'M,'Y'K' inks 510 are 1-bit values.

The output of quantizer 502 is also input to error calculation unit 503 that calculates the difference between the output of quantizer 502 and the input to quainter 502. This is done on a plane-by-plane basis. That is, the output of error calculation unit 503 is calculated according to the following equation:

error=(input($c$)-anchor($c$), input($m$)-anchor($m$), input($y$)-anchor($y$), input($k$)-anchor($k$))

The output of the error is input to error filtering unit 504 that provides error values to summation unit 504 to diffuse the error through other pixels of the CMYK input pixels 500. The filtering performed by error filtering unit 504 may also be done on a plane-by-plane basis. Alternatively, the error filtering might pass error between color planes.

Other variations to the above are possible and may be made based on vector operations on the color planes. Also, it is possible that the mapping might be to K and other values. For example, the 4 component vector (255, 255, 255, 255) might be mapped to KC.

An Alternative Embodiment of an Ink Reduction Technique

Although anchors may be the same 16 colors that are printed, C, M, Y, K, CM, CY, CK, MY, MK, YK, CMY, CMK, CYK, MYK, CMYK, W, the anchors may be different in alternative embodiments. In other embodiments, other anchors may be used, such as ((0.35 c, k), (0.31 m, k), (0.31 m, 0.31 y, k), (0.31 c, 0.31 y, k), (0.35 c 0.35 m, k), (0.67 c, 0.67 m, 0.67 y, k). Those additional anchors are mapped to K. The mapping performed after the quantizer maps the anchors to actual printing colors. In one embodiment, all the additional anchors are mapped after the quantizer to the print output K.

Figure 6:
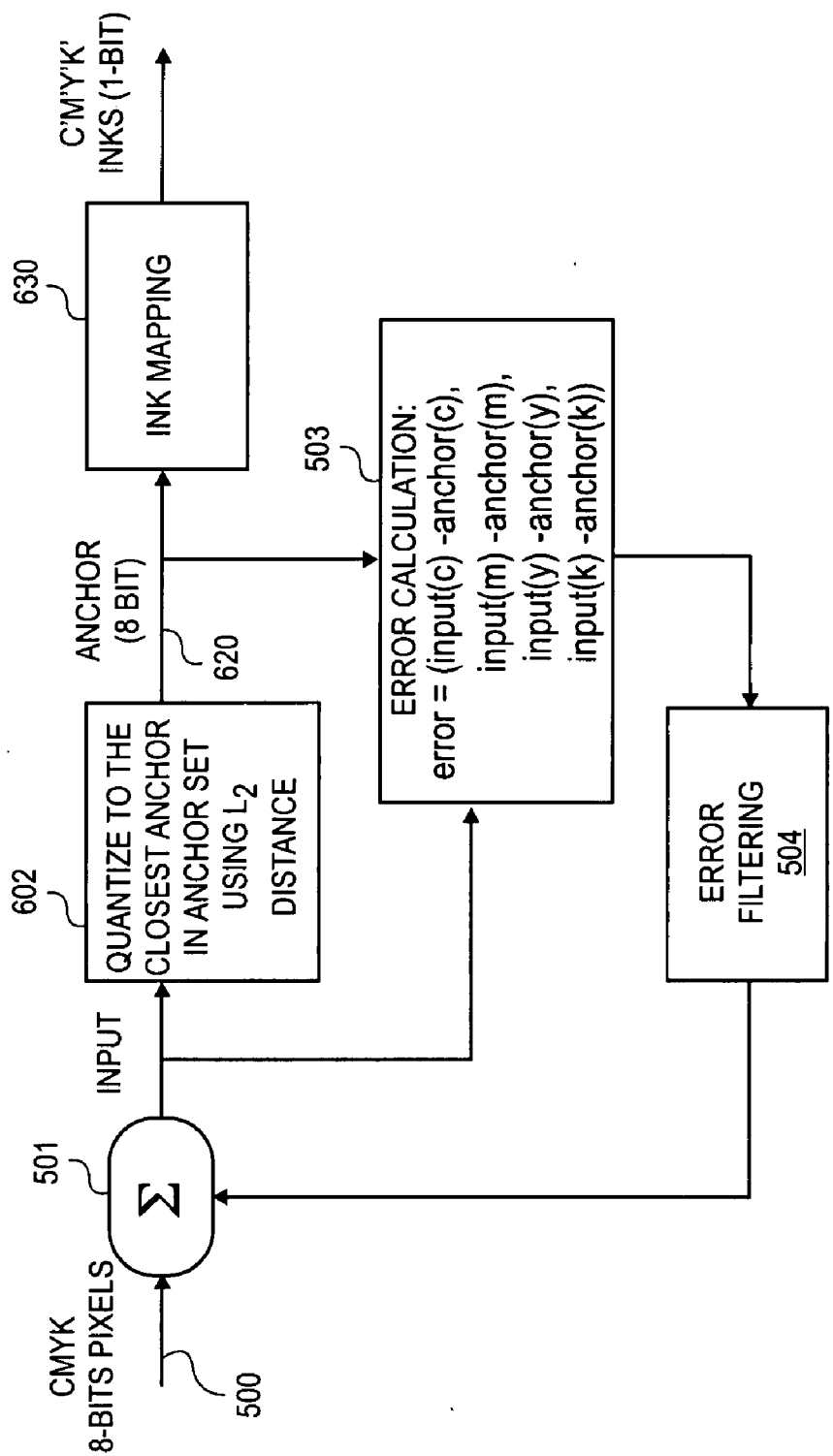
FIG. 6 is a flow diagram of another embodiment of an error diffusion unit.

FIG. 6 us a flow diagram of another embodiment of an error diffusion unit, which is very similar to the flow diagram of FIG. 5, except for quantizer 602 and WCR 630. Each of the blocks in FIG. 6 comprises processing logic that mat comprise hardware (e.g., circuitry, dedicated logic, etc.), software (such as is performed by a general purpose computer system or a dedicated machine), or a combination of referring to FIG. 6, quantizer 602 quantizes the input that is output from summation unit 501 to the closest anchor in the anchor set using a distance metriced, which may be the $L_2$ or $L_1$ distances previously described, for example. The anchor set includes the basic colors and black anchors discussed in conjunction with FIG. 5, along with some additional anchors. The closed anchor is output as anchor 620. In one embodiment, anchor 620 is an 8-bit anchor.

Table 2 illustrates the specific ink mapping performed by ink mapping unit 630. Note that this table also includes the additional anchors.

TABLE 2

|  | ANCHOR | | | | |
| --- | --- | --- | --- | --- | --- |
|  | C | M | Y | K | Inks |
| Additional/ | 275 | 280 | 290 | 0 | K' |
| modified | 90 | 0 | 0 | 255 | K' |
|  | 0 | 80 | 0 | 255 | K' |
|  | 0 | 80 | 80 | 255 | K' |
|  | 80 | 0 | 80 | 255 | K' |
|  | 90 | 90 | 0 | 255 | K' |
|  | 170 | 170 | 170 | 255 | K' |
| Basic | 0 | 0 | 0 | 0 | W |
| Colors | 255 | 0 | 0 | 0 | C' |
|  | 0 | 255 | 0 | 0 | M' |
|  | 0 | 0 | 255 | 0 | Y' |
|  | 255 | 255 | 0 | 0 | C'M' |
|  | 255 | 0 | 255 | 0 | C'Y' |
|  | 0 | 255 | 255 | 0 | M'Y' |
|  | 255 | 255 | 255 | 0 | C'M'Y' |
| Black | 0 | 0 | 0 | 255 | K' |
| Anchors - | 255 | 0 | 0 | 255 | K' |
| all map to K | 0 | 255 | 0 | 255 | K' |
|  | 255 | 255 | 0 | 255 | K' |
|  | 0 | 0 | 255 | 255 | K' |
|  | 255 | 0 | 255 | 255 | K' |
|  | 0 | 255 | 255 | 255 | K' |
|  | 255 | 255 | 255 | 255 | K' |

Another Alternative Embodiment of an Ink Reduction Technique

Figure 7:
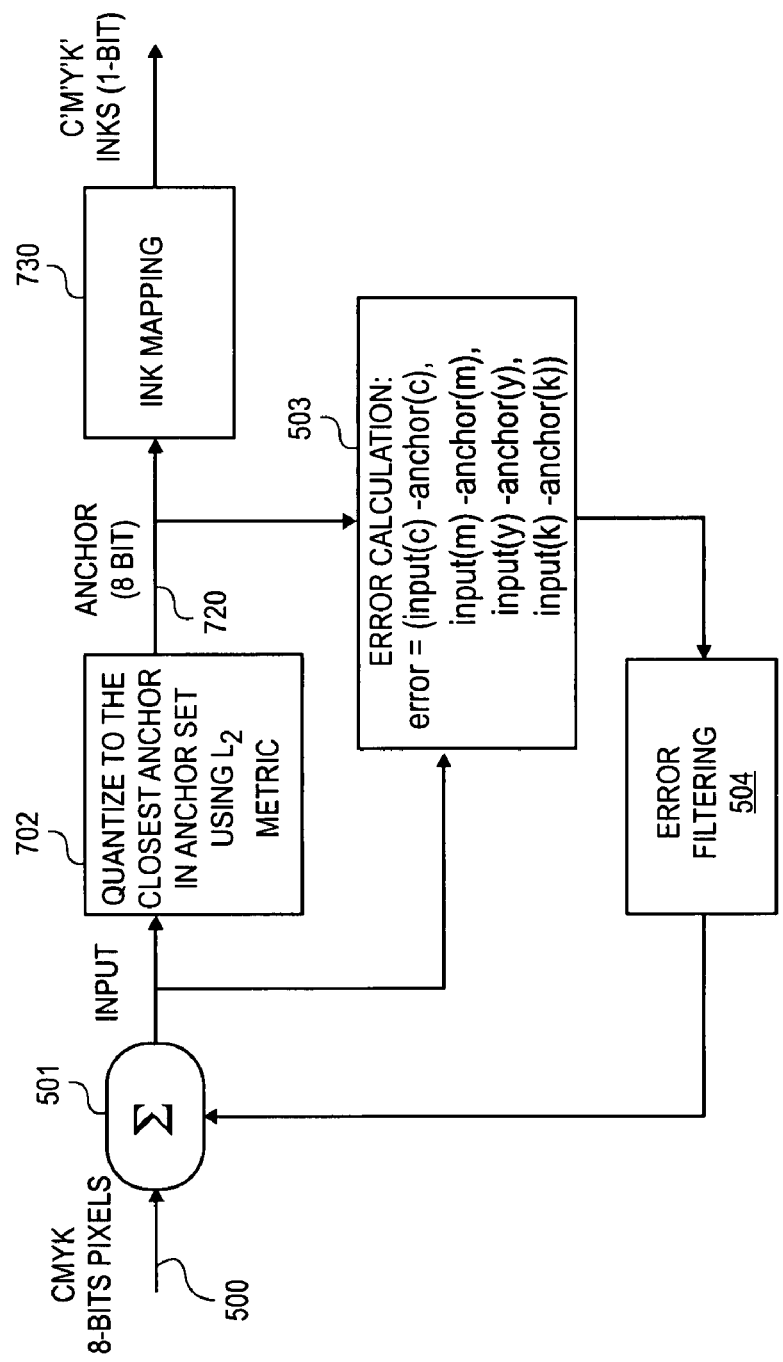
FIG. 7 is a flow diagram of still another embodiment of an error diffusion unit.

In another embodiment, the quantizer may have additional anchors that include all colors, ($\alpha$, $\beta$, $\gamma$, 255) where $\alpha$, $\beta$, and $\gamma$ are any value [0 . . . 255]. Thus, additional anchors map to K. FIG. 7 is a flow diagram of still another embodiment of an error diffusion unit with such a quantizer. Each of the blocks in FIG. 7 comprises processing logic that may comprise hardware (e.g., circuitry, dedicated logic, etc.), software (such as is performed by a general purpose computer system or a dedicated machine), or a combination of both. Referring to FIG. 7, quantizer 702 produces an anchor 720, which ink mapping unit 730 maps to a specific ink. In such a case, the anchors and ink mapping are shown in Table 3 below

TABLE 3

|  | ANCHOR | | | | Inks |
| --- | --- | --- | --- | --- | --- |
|  | C | M | Y | K |  |
| Basic | 0 | 0 | 0 | 0 | W' |
| Colors | 255 | 0 | 0 | 0 | C' |
|  | 0 | 255 | 0 | 0 | M' |
|  | 0 | 0 | 255 | 0 | Y' |
|  | 255 | 255 | 0 | 0 | C'M' |
|  | 255 | 0 | 255 | 0 | C'Y' |
|  | 0 | 255 | 255 | 0 | M'Y' |
|  | 255 | 255 | 255 | 0 | C'M'Y' |
| Black Anchors - all map to K | $\alpha$ | $\beta$ | $\gamma$ | 255 | K' |

A comparison between conventional plane-by-plane error diffusion (pbpED) and the use of quantizer 702 having additional anchors that include all colors ($\alpha$, $\beta$, $\gamma$, 255) and ink mapping unit 730 that follows a mapping rule to map any color (($\alpha$, $\beta$, $\gamma$, 255) to K) is given below. The input and each of the resulting vectors are ordered sets of CMYK values.

```
Example 1: colors  (C,    Y,    M,    K)
         input:    (0,    200,  100,  200)
         pbpED Q:  (0,    255,  0,    255)   → print MK
         pbp error:(0,    -55,  100,  -55)
         quant (702) Q: (0, 200, 100, 255)   → map (730)
                                             → print K
         error (703)    (0,   0,    0,    -55)
Example 2:
         input:    (200,  0,    0,    0)
         pbpED Q:  (255,  0,    0,    0)     → print C
         pbp error:(-55,  0,    0,    0)
         quant (702) Q: (255, 0,  0,    0)   → map (730)
                                             → print C
         error (703)    (-55, 0,  0,    0)
Example 3:
         input:    (200,  0,    0,    200)
         pbpED Q:  (255,  0,    0,    255)   → print CK
         pbp error:(-55,  0,    0,    -55)
         quant (702) Q: (200, 0,  0,    255) → map (730)
                                             → print K
         error (703)    (0,   0,    0,    -55)
```

Another Modified Vector Error Diffusion Technique

Figure 8:
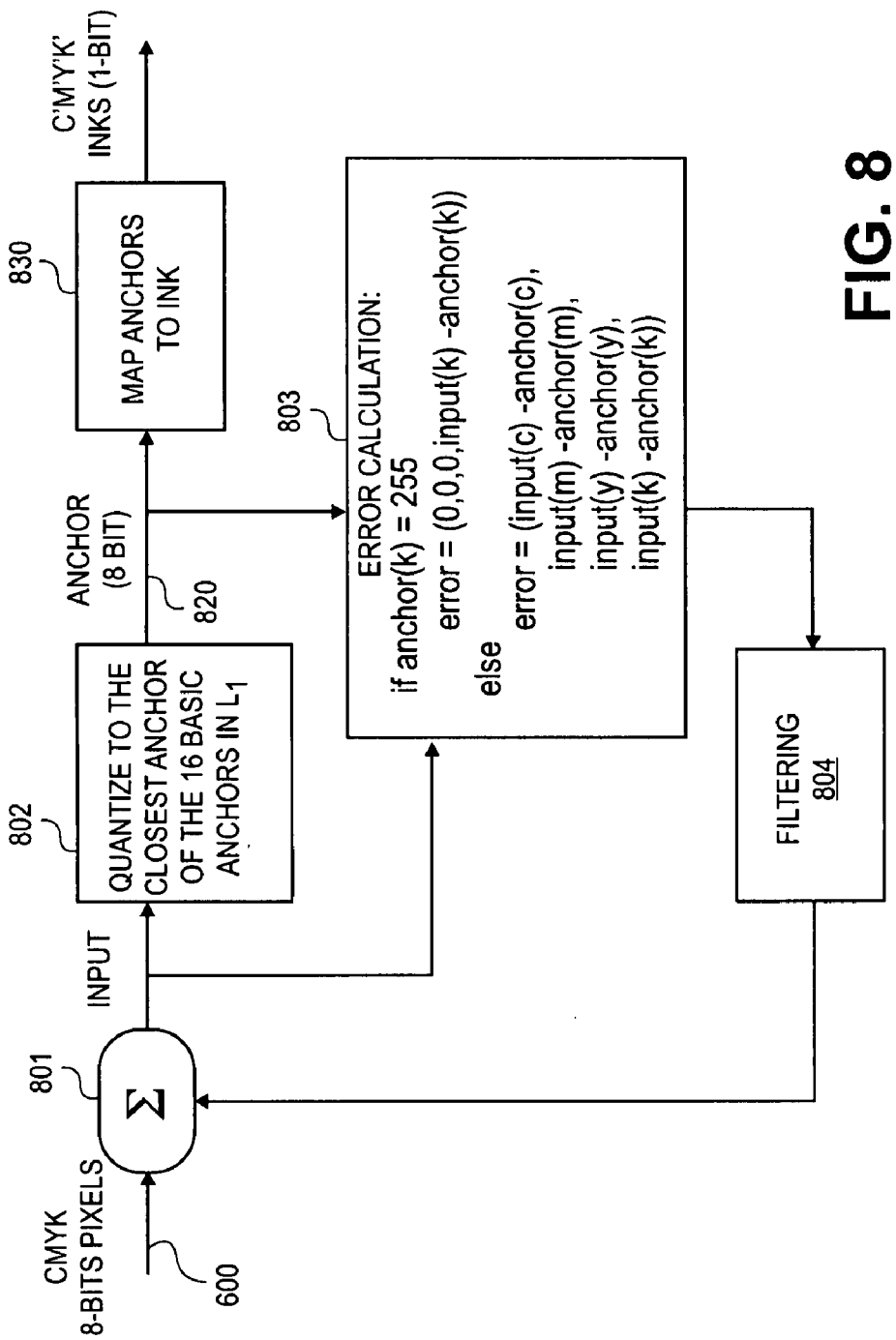
FIG. 8 illustrates a flow diagram of one embodiment of an error diffusion unit that performs vector error diffusion followed by ink mapping.

FIG. 8 illustrates is a flow diagram of one embodiment of an error diffusion unit that performs vector error diffusion followed by waste color removal. Each of the blocks in FIG. 8 comprises processing logic that may comprise hardware (e.g., circuitry, dedicated logic, etc.), software (such as is performed by a general purpose computer system or a dedicated machine), or a combination of both.

Referring to FIG. 8, CMYK input pixels 800 are input into summation unit 801. In one embodiment, each of the CMYK pixels is 8 bits. Summation unit 801 also receives an input from error filtering unit 804 and applies error values produced as a result of performing quantization on previous input pixels to input pixels 800 in a manner well-known in the art of error diffusion.

The output of summation unit 801 is input to quantizer 802, which performs vectors quantizatin on the input pixels, and is input to error calculation unit 803. Quantizer 802 quantizes the input pixels to the closest anchor of 16 basic anchors using and $L_1$ distance metric in one embodiment. The quantization is performed on a plane by plane basis. More specifically, the anchors are the basic combinations of 4 inks (C, M, Y, K, CM, CY, CK, MY, MK, YK, CMY, CMK, CYK, MYK, CMYK, W) available for quantization and the $L_1$ distance is chosen for determining the closest ink. In one embodiment, the anchor is an 8 bit number. Alternatively, quantizer 802 might use a Euclidean ($L_2$) distance to determine the closest ink or some other well-known distance measure. Note that the anchors to which the input pixels are quantized do not have to be colors that may be printed.

The anchor output 820 of quantizer 802 is input to mapping unit 830. Mapping unit 830 maps the anchor output 820 to inks. In one embodiment, mapping unit maps anchors to inks according to Table 4 below. Note that all anchors with equal to 255 map to K.

TABLE 4

| | Ink Mapping | | | | |
|---|---|---|---|---|---|
| | C | M | Y | K | Inks |
| Basic | 0 | 0 | 0 | 0 | W' |
| Colors | 255 | 0 | 0 | 0 | C' |
| | 0 | 255 | 0 | 0 | M' |

TABLE 4-continued

| | Ink Mapping | | | | |
|---|---|---|---|---|---|
| | C | M | Y | K | Inks |
| | 0 | 0 | 255 | 0 | Y' |
| | 255 | 255 | 0 | 0 | C'M' |
| | 255 | 0 | 255 | 0 | C'Y' |
| | 0 | 255 | 255 | 0 | M'Y' |
| | 255 | 255 | 255 | 0 | C'M'Y' |
| All K = 255 | 255 | 0 | 0 | 255 | K' |
| anchors | 0 | 255 | 0 | 255 | K' |
| map | 255 | 255 | 0 | 255 | K' |
| to K | 0 | 0 | 255 | 255 | K' |
| | 255 | 0 | 255 | 255 | K' |
| | 0 | 255 | 255 | 255 | K' |
| | 255 | 255 | 255 | 255 | K' |
| | 0 | 0 | 0 | 0 | K' |

The outputs of mapping unit 830 are C'M'Y'K' inks 810. In one embodiment, C'M'Y'K' inks 810 are 1-bit values.

The output of quantizer 802 is also input to error calculation unit 803 that calculates the difference between the output of quantizer 802 and the input to quantizer 802. That is, the output of error calculation unit 803 is calculated according to the following:

```
if anchor(k) =255, then
    error = (0, 0, 0, input(k)-anchor(k))
else
    error = (input(c)-anchor(c),
            input(m)-anchor(m),
            input(y)-anchor(y),
            input(k)-anchor(k))
```

If quantizer 802 does not quantize to 255 for the k-plane, then the error calculation is the conventional plane-by-plane error calculation. If quantizer 802 quantizes to 255 for the k-plane, then the error is 0 for the C, M, and Y planes. The error for the k plane is calculated as normal.

The output of the error is input to error filtering unit 804 that provides error values to summation unit 804 to diffuse the error through other pixels of the CMYK input pixels 800. In one embodiment, the filter to perform filtering for error filtering unit 804 comprises a Stucki 12 tap filter (See Henry Kang, *Digital Color Halftoning*, SPIE Press, 2001).

The filtering performed by error filtering unit 804 may be done on a plane-by-plane basis. Alternatively, the error filtering might pass error between color planes.

A few examples of the application of this error diffusion technique are given below. The input and each of the resulting vectors are ordered sets of CMYK values.

```
Example 1: Colors (C,    Y,    M,    K)
         input:    (0,    200,  100,  200)
         pbpED Q:  (0,    255,  0,    255)   → print MK
         pbp error:(0,    -55,  100,  -55)
         quant(802) Q: (0, 255, 0,    255)   → map (830)
                                             → print K
         error (803)    (0,   0,    0,    -55)
Example 2:
         input:    (100,  0,    0,    100)
         pbpED Q:  (0,    0,    0,    0)     → map(830)
                                             → print W
         pbp error:(100,  0,    0,    100)
         quant (802) Q: (0, 0,   0,    0)    → print W
         error (803)    (100, 0,  0,    100)
```

-continued

| Example 3: | | | | | |
|---|---|---|---|---|---|
| input: | (200, | 0, | 0, | 200) | |
| pbpED Q: | (255, | 0, | 0, | 255) | → print CK |
| pbp error: | (−55, | 0, | 0, | −55) | |
| quant (802) Q: | (255, | 0, | 0, | 255) | → map (830) |
| | | | | | → print K |
| error (803) | (0, | 0, | 0, | −55) | |

Mathematical Description of Plane-by-Plane Error Diffusion, WCR and Error Diffusion A mathematical description of conventional plane-by-plane error diffusion is given and then similar sets of equations are derived for the WCR (with plane-by-plane error diffusion) and other error diffusion techniques described above that lead to mathematical systems of equations for those two methods.

Plane-by-Plane Error Diffusion

Plane-by-plane error diffusion is typically described by three equations, an equation to modify the input by adding error from previous pixels, an equation defining the error, and an equation defining the quantizer (see Equation 1, Equation 2, and Equation 3 below).

Let x(t) be the input image signal at location t. Following the literature, plane-by-plane error diffusion is described by the following two equations characterizing the signal plus inherited error $$\tilde{x}(t) = x(t) + \sum_{j=1}^{J} h_j \cdot n(t-j) \quad (1)$$

where $\tilde{x}(t)$ is the error diffusion output signal, and the error $$Q(\tilde{x}(t)) = \tilde{x}(t) - n(t) \quad (2)$$

where $h=(h_1, \ldots h_J)$ is the error diffusion filter with $$\sum_{j=1}^{J} h_j = 1$$

and Q(.) is the quantization operator. For simplicity it is assumed that $$x(t) \in [0,1]$$

for all t. As a consequence the quantizer is defined as follows $$Q(x(t)) = \begin{cases} 1, & x(t) \geq 0.5 \\ 0, & x(t) < 0.5 \end{cases} \quad (3)$$

The combination of Equation 1 and Equation 2 leads to the following characterization of the quantized output. More specifically, by rewriting equation (2) as $$\tilde{x}(t) = Q(\tilde{x}(t)) + n(t)$$

and then substituting $\tilde{x}(t)$ by the right side of equation (1) results in $$Q(\tilde{x}(t)) = x(t) - n(t) + \sum_{j=1}^{J} h_j \cdot n(t-j) \quad (4)$$

By defining $\bar{h} = (h_0, h_1 \ldots h_J)$ with $h_0 = -1$, then Eq. (4) may be expressed as $$Q(\tilde{x}(t)) = x(t) + h_0 \cdot n(t) + \sum_{j=1}^{J} h_j n(t-j)$$

$$= x(t) + \sum_{j=0}^{J} h_j n(t-j)$$

The extended filter $\bar{h} = (h_0, h_1, \ldots h_J)$ is now a high pass filter, and the quantized output is interpreted as the original signal and high frequency noise.

Plane-by-Plane Error Diffusion Extended to Color

For CMYK input the signal x is given by the 4 dimensional vector.

$$x(t) = (x_C(t), x_M(t), x_Y(t), x_K(t))^T.$$

If plane-by-plane error diffusion is applied independently to each color plane each quantized output can be described with Equation 4 as $$Q(\tilde{x}_C(t)) = x_C(t) + \sum_{j=0}^{J} h_j \cdot n_C(t-j), \quad (5)$$

$$Q(\tilde{x}_M(t)) = x_M(t) + \sum_{j=0}^{J} h_j \cdot n_M(t-j),$$

$$Q(\tilde{x}_Y(t)) = x_Y(t) + \sum_{j=0}^{J} h_j \cdot n_Y(t-j), \text{ and}$$

$$Q(\tilde{x}_K(t)) = x_K(t) + \sum_{j=0}^{J} h_j \cdot n_K(t-j).$$

Waste Color Removal (WCR) Following Plane-by-Plane Error Diffusion

For 100% WCR, a dot in the color plane is removed when the halftoned black plane places a K dot at that location. Therefore, for 100% WCR following plane-by-plane error diffusion, first each of the color planes can be error-diffused independently. In a second step, the K output is combined with each of the color outputs in the following way. If the output of the K-plane is a '1' (representing a signal to print a K), then the output of each of the color planes C, M, and Y is set to 0 (representing signals to not print C, M or Y). Thus, the output of the WCR for the K halftone is unchanged, but for the C, M and Y halftone the WCR output is described by, $$Q_{WCR}(x_\lambda(t)) = (1 - Q((x_K(t))) \cdot Q(x_\lambda(t)), \quad (6)$$

where $$\lambda \in \{C, M, Y\}.$$

Error Diffusion

For the ink reduction technique of FIG. 8, the error is computed differently than in plane-by-plane error diffusion. Also, the ink reduction technique of FIG. 8 includes WCR applied to the quantized output. The error calculation is described in FIG. 6 as

```
if anchor(k) = 255
    error = (0,0,0,input(k)-anchor(k))
else
    error = (input(c)-anchor(c),
            input(m)-anchor(m),
            input(y)-anchor(y),
            input(k)-anchor(k))
end.
```

Since the expression anchor(k) becomes "a dot in the halftoned K plane," the error in a color plane is influenced by the already halftoned K plane. If the halftoned K does not print a dot the error is computed as in the VED shown in FIG. 4. In the case of choosing the $L_1$ distance in the quantization box VED quantization is identical to plane-by-plane error diffusion quantization. Translating these observations into the mathematical language of Equation 1 and Equation 2 yields the following.

The halftoned K-plane is modeled the same way as for plane-by-plane error diffusion for the K-plane, i.e. with output $$Q(\tilde{x}_K(t))$$

from Equation 5.

Following the description in Equation 1 and Equation 2, the three color planes $$\lambda \in \{C,M,Y\}$$

are modeled by the input signal plus inherited error, $$\tilde{x}_\lambda(t) = x_\lambda(t) + \sum_{j=1}^{J} h_j \cdot \overline{n_\lambda}(t-j), \quad (7)$$

and the error $$\overline{n_\lambda}(t) = (1 - Q(\tilde{x}_K(t))) \cdot (\tilde{x}_\lambda(t) - Q(\tilde{x}_\lambda(t))) = (1 - Q(\tilde{x}_k(t))) \cdot n_2(t). \quad (8)$$

Let 100% WCR be applied to the quantized output $$Q(\tilde{x}_\lambda(t)),$$

using Equation 6 the final binary signal is described expressed by $$Q(\tilde{x}_\lambda(t)) = (1 - Q(\tilde{x}_K(t))) \cdot Q(\tilde{x}_\lambda(t)). \quad (9)$$

Figure 9:
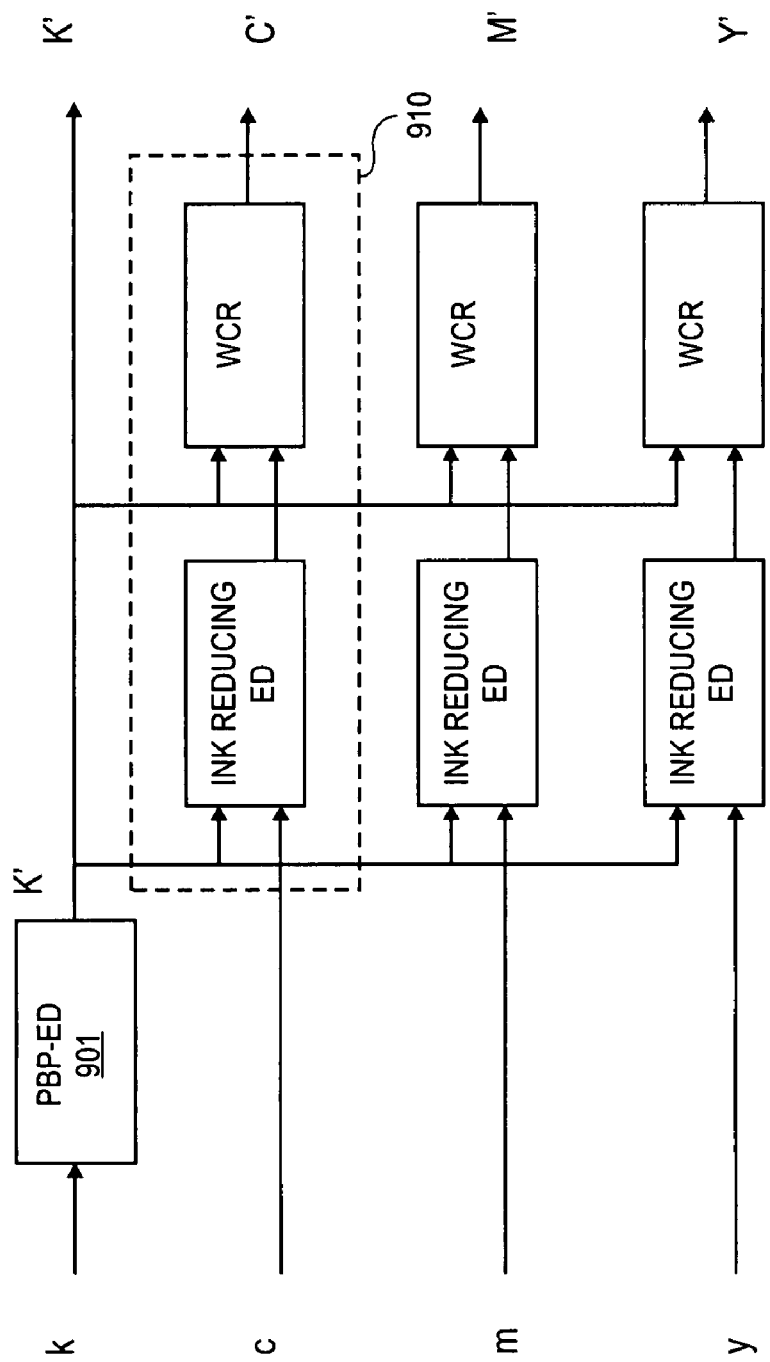
FIG. 9 is a flow diagram of one embodiment of an error diffusion unit that performs vector error diffusion followed by waste color removal.
Figure 10:
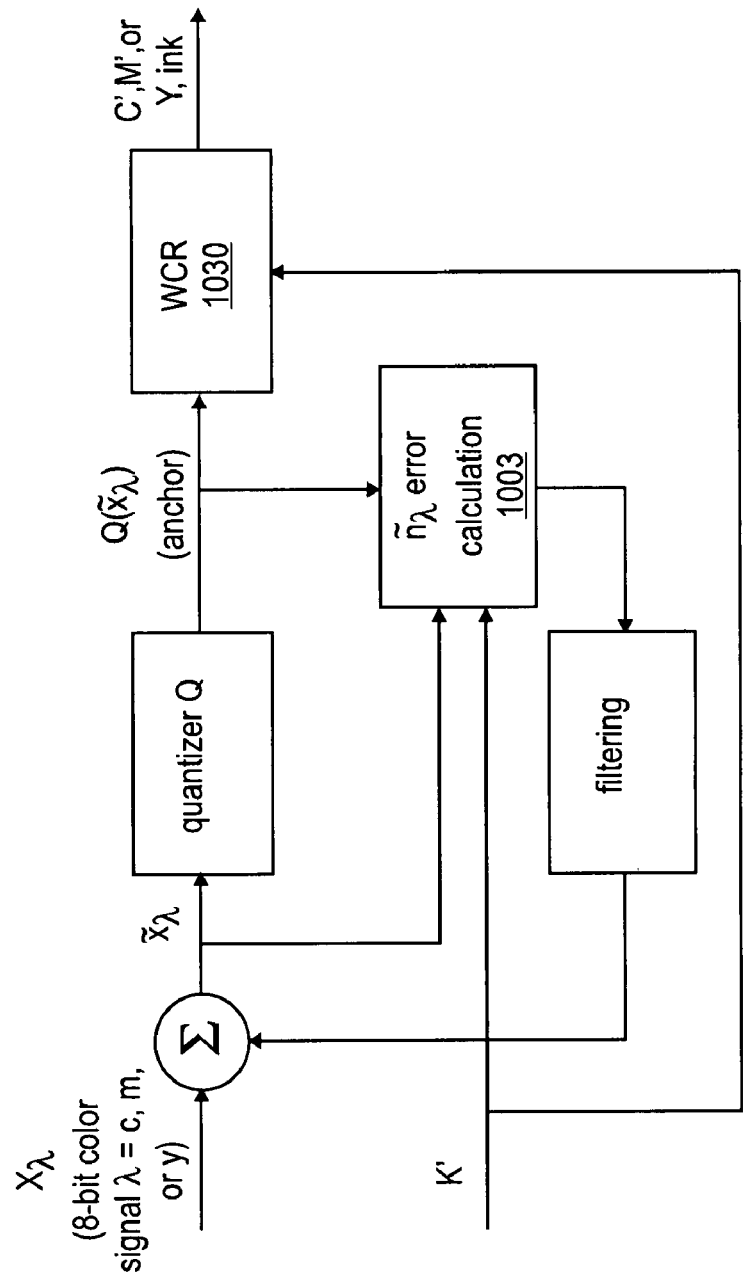
FIG. 10 is a flow diagram of one embodiment of an error diffusion unit that uses the results of processing of another color plane.

This description of the ink reduction technique of FIG. 8 illustrates that the technique is separable for each color plane, given that the halftoned output of the K plane is available. The separable implementation is shown in FIGS. 9 and 10. Referring to FIG. 9, plane-by-plane error diffusion (pbp-ED) is performed on the black (K) color plane by unit 901. The output of unit 901, K', is output and supplied to error diffusion units and WCR units for the other color planes. One such pair, 910, is shown in more detail in FIG. 10. The embodiment shown in FIG. 10 may be used for any of the non-black color planes. Referring to FIG. 10, the result of the plane-by-plane error diffusion performed on black plane, namely, K', is input to error calculation unit 1003 and WCR 1030.

Although FIG. 10 illustrates performing the black plane first and using its results when processing the other color planes, it is possible to process the black plane and one or more of the other color planes first and use the results of processing such color planes on the other color planes. Thus, the first set of color planes are processed and the output (with some additional information) is used to halftone other color planes. The additional information may be segmentation data as described above. Alternatively, one or more color planes other than black may be processed first, with their results being used for processing other bit planes.

An Exemplary Computer System Implementation

Figure 11:
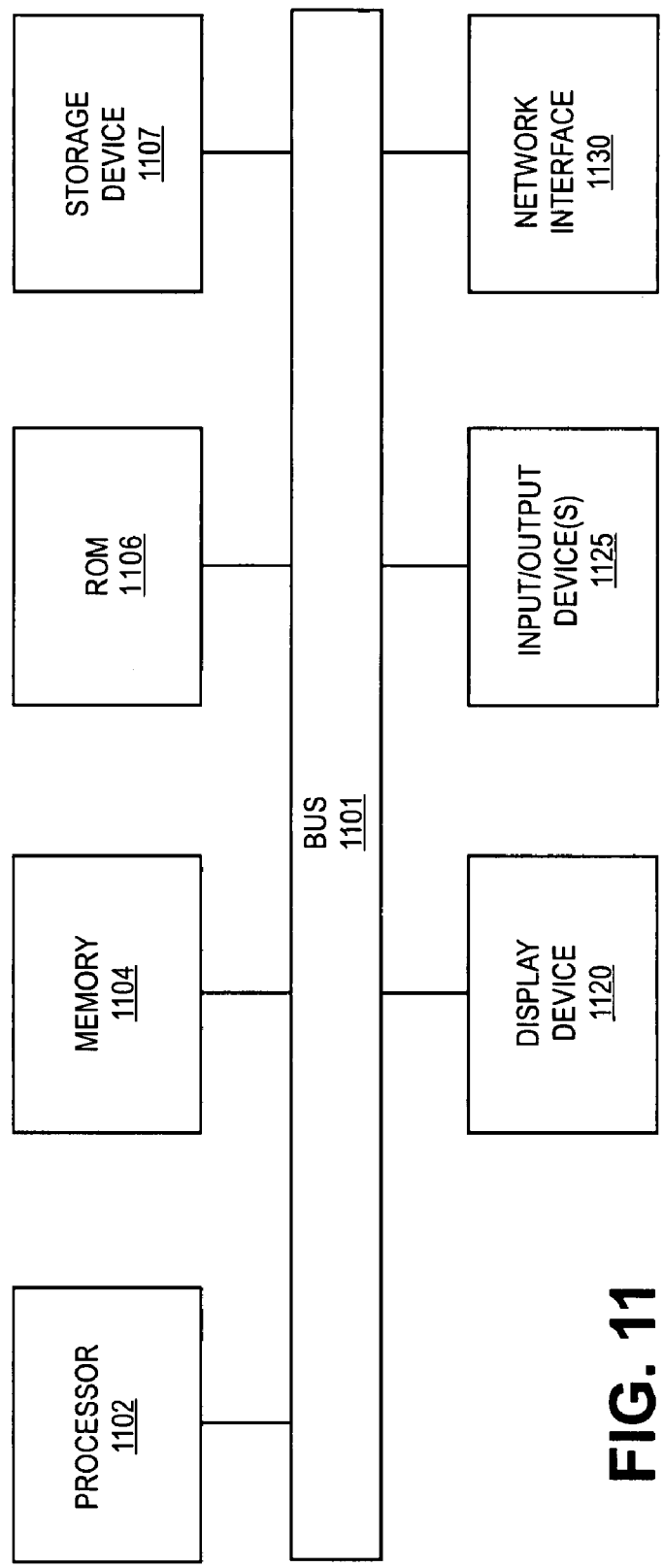
FIG. 11 is a block diagram of one embodiment of an electronic system.

In one embodiment, the techniques described above can be implemented as sequences of instructions executed by an electronic system, for example, a computer system or a color printer. The instructions can be stored by the electronic device or the instructions can be received by the electronic device (e.g., via a network connection). FIG. 11 is a block diagram of one embodiment of an electronic system.

Electronic system 1100 includes bus 1101 or other communication device to communicate information, and processor 1102 coupled to bus 1101 to process information. While electronic system 1100 is illustrated with a single processor, electronic system 1100 can include multiple processors and/or co-processors. Electronic system 1100 further includes random access memory (RAM) or other dynamic storage device 1104 (referred to as memory), coupled to bus 1101 to store information and instructions to be executed by processor 1102. Memory 1104 also can be used to store temporary variables or other intermediate information during execution of instructions by processor 1102.

Electronic system 1100 also includes read only memory (ROM) and/or other static storage device 1106 coupled to bus 1101 to store static information and instructions for processor 1102. Data storage device 1107 is coupled to bus 1101 to store information and instructions. Data storage device 1107 such as a magnetic disk or optical disc and corresponding drive can be coupled to electronic system 1100.

Electronic system 1100 can also be coupled via bus 1101 to an optional display device 1120, such as a cathode ray tube (CRT) or liquid crystal display (LCD), to display information to a user. Input/output device(s) 1125 can include, for example, a cursor control device, such as a mouse, a trackball, or cursor direction keys to communicate direction information and command selections to processor 1102 and to control cursor movement on display device 1120. Electronic system 1100 further includes network interface 1130 to provide access to a network, such as a local area network.

Instructions are provided to memory from a storage device, such as magnetic disk, a read-only memory (ROM) integrated circuit, CD-ROM, DVD, via a remote connection (e.g., over a network via network interface 1130) that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
performing vector error diffusion, including
quantizing each input pixel value to a closest anchor in an anchor set,
calculating errors based on differences between the input pixel values and the anchors, and
performing error filtering based on calculated errors;
mapping anchors to printing colors, where more than one of the anchors maps to one of the printing colors.

2. The method defined in claim 1 wherein the closest anchor is one of a plurality of ink combinations.

3. The method defined in claim 1 wherein quantizing each input pixel value to the closest anchor comprises determining which anchor of the set of anchors is closest using a distance metric.

4. The method defined in claim 3 wherein the distance metric comprises the $L_1$ distance d(x,y) defined as:

$$\sum_{i=1}^{n} |x_i - y_i|$$

where x and y are vectors that each have n components.

5. The method defined in claim 3 wherein the distance metric comprises the Euclidean distance d(x,y) defined as:

$$\sqrt{\sum_{i=1}^{n} (x_i - y_i)^2}$$

6. The method defined in claim 3 wherein mapping anchors to printing colors comprises mapping anchors with a maximum black value to an ink color K.

7. The method defined in claim 3 wherein the set of anchors includes at least one cyan, magenta, and yellow being at a first predetermined maximum value and black being at a second predetermined maximum value.

8. The method defined in claim 7 wherein the first and second predetermined maximum values are $2^n-1$ where n is the number of bits used to represent first and second predetermined maximum values.

9. The method defined in claim 7 wherein the first and second predetermined maximum values are 255 where values range from 0 to 255.

10. The method defined in claim 7 wherein the first and second predetermined maximum values are 1.0 where values range from 0.0 to 1.0.

11. The method defined in claim 7 wherein the set of anchors further includes the following anchors represented as CMYK vectors: (275, 280, 290, 0), (90, 0, 0, 255), (0, 80, 0, 255), (0, 80, 80, 255), (80, 0, 80, 255), (90, 90, 0, 255), (170, 170, 170, 255).

12. The method defined in claim 11 wherein quantizing each input pixel value to the closest anchor comprises determining which anchor of the set of anchors is closest using a distance metric.

13. The method defined in claim 12 wherein the distance metric comprises the Euclidean distance d(x,y) defined as:

$$\sqrt{\sum_{i=1}^{n} (x_i - y_i)^2}.$$

14. The method defined in claim 12 wherein the distance metric comprises the $L_1$ distance d(x,y) defined as:

$$\sum_{i=1}^{n} |x_i - y_i|$$

where x and y are vectors that each have n components.

15. The method defined in claim 11 wherein calculating errors comprises:
calculating an error by subtracting the anchor for each color plane from a corresponding color plane in the input pixel if the black color plane of the anchor is not at its maximum value; and
calculating the error as zero in all non-black color planes and subtracting the black color plane value in the anchor from the black color plane value in the input pixel when the black color plane in the anchor is at its maximum value.

16. The method defined in claim 3 wherein the set of anchors includes one or more of cyan, magenta, and yellow being at any value and black being at least at a predetermined maximum value.

17. The method defined in claim 16 wherein the first and second predetermined maximum values are $2^n-1$ where n is the number of bits used to represent first and second predetermined maximum values.

18. The method defined in claim 16 wherein the predetermined maximum value is 255.

19. The method defined in claim 16 wherein quantizing each input pixel value to the closest anchor comprises determining which anchor of the set of anchors is closest using a distance metric.

20. The method defined in claim 19 wherein the distance metric comprises the Euclidean distance d(x,y) defined as:

$$\sqrt{\sum_{i=1}^{n} (x_i - y_i)^2}.$$

21. The method defined in claim 19 wherein the distance metric comprises the $L_1$ distance d(x,y) defined as:

$$\sum_{i=1}^{n} |x_i - y_i|$$

where x and y are vectors that each have n components.

22. The method defined in claim 16 wherein calculating errors comprises:
calculating an error by subtracting the anchor for each color plane from a corresponding color plane in the input pixel if the black color plane of the anchor is not at its maximum value; and
calculating the error as zero in all non-black color planes and subtracting the black color plane value in the anchor from the black color plane value in the input pixel when the black color plane in the anchor is at its maximum value.

23. The method defined in claim 1 wherein calculating errors comprises performing a plane-by-plane error calculation.

24. The method defined in claim 1 wherein calculating errors comprises:
   calculating an error by subtracting the anchor for each color plane from a corresponding color plane in the input pixel if the black color plane of the anchor is not at its maximum value; and
   calculating the error as all zeros in all non-black color planes and subtracting the black color plane value in the anchor from the black color plane value in the input pixel when the black color plane in the anchor is at its maximum value.

25. The method defined in claim 24 wherein quantizing each input pixel value to the closest anchor comprises determining which anchor of the set of anchors is closest using a distance metric.

26. The method defined in claim 24 wherein the distance metric comprises the Euclidean distance d(x,y) defined as:

$$\sqrt{\sum_{i=1}^{n}(x_i - y_i)^2}.$$

27. The method defined in claim 25 wherein the distance metric comprises the $L_1$ distance d(x,y) defined as:

$$\sum_{i=1}^{n}|x_i - y_i|$$

where x and y are vectors that each have n components.

28. The method defined in claim 1 wherein the printing colors comprises a plurality of inks.

29. The method defined in claim 28 wherein the plurality of inks comprises a K ink and at least three other inks.

30. The method defined in claim 29 wherein the at least three other inks comprises five inks.

31. The method defined in claim 1 wherein the closest anchor is represented with 8 bits.

32. The method defined in claim 1 wherein the closest anchor is represented with less than 8 bits.

33. An apparatus comprising:
   means for performing vector error diffusion, including
      means for quantizing each input pixel value to a closest anchor in an anchor set,
      means for calculating errors based on differences between the input pixel values and the anchors, and
      means for performing error filtering based on calculated errors;
      means for mapping anchors to printing colors where more than one of the anchors maps to one of the printing colors.

34. An apparatus comprising:
   a vector error diffusion to perform vector error diffusion, including
      a quantizer to quantize each input pixel value to a closest anchor in an anchor set,
      an error calculation unit coupled to the quantizer to calculate errors based on differences between the input pixel values and the anchors, and
      a filter coupled to the error calculation unit to perform error filtering based on calculated errors; and
      a mapping unit to map anchors to printing colors where more than one of the anchors maps to one of the printing colors, wherein the number of anchors is greater than the number of printing colors.

35. The apparatus defined in claim 34 wherein the quantizer determines which anchor of the set of anchors is closest using a distance metric.

36. The apparatus defined in claim 35 wherein the mapping unit maps anchors with a maximum black value to an ink color K.

37. The apparatus defined in claim 35 wherein the set of anchors includes at least one cyan, magenta, and yellow being at a first predetermined maximum value and black being at a second predetermined maximum value.

38. The apparatus defined in claim 37 wherein the first and second predetermined maximum values are $2^n-1$ where n is the number of bits used to represent first and second predetermined maximum values.

39. The apparatus defined in claim 37 wherein the set of anchors further includes the following anchors represented as CMYK vectors: (275, 280, 290, 0), (90, 0, 0, 255), (0, 80, 0, 255), (0, 80, 80, 255), (80, 0, 80, 255), (90, 90, 0, 255), (170, 170, 170, 255).

40. The apparatus defined in claim 35 wherein the set of anchors includes one or more of cyan, magenta, and yellow being at any value and black being at least at a predetermined maximum value.

41. The apparatus defined in claim 34 wherein the error calculation unit calculates errors by:
   calculating an error by subtracting the anchor for each color plane from a corresponding color plane in the input pixel if the black color plane of the anchor is not at its maximum value; and
   calculating the error as all zeros in all non-black color planes and subtracting the black color plane value in the anchor from the black color plane value in the input pixel when the black color plane in the anchor is at its maximum value.

42. An article of manufacture comprising one or more recordable media containing executable instructions that, when executed by a system, cause the system to:
   perform vector error diffusion, including
      quantize each input pixel value to a closest anchor in an anchor set,
      calculate errors based on differences between the input pixel values and the anchors, and
      perform error filtering based on calculated errors;
   map anchors to printing colors where more than one of the anchors maps to one of the printing colors wherein the number of anchors is greater than the number of printing colors.

43. The article of manufacture defined in claim 42 wherein instructions executed by the system cause the system to quantize each input pixel value to the closest anchor by determining which anchor of the set of anchors is closest using a distance metric.

44. The article of manufacture defined in claim 43 wherein instructions executed by the system cause the system to map anchors to printing colors by mapping anchors with a maximum black value to an ink color K.

45. The article of manufacture defined in claim 43 wherein the set of anchors includes at least one cyan, magenta, and yellow being at a first predetermined maximum value and black being at a second predetermined maximum value.

46. The article of manufacture defined in claim 45 wherein the first and second predetermined maximum values are $2^n-1$ where n is the number of bits used to represent first and second predetermined maximum values.

47. The article of manufacture defined in claim 45 wherein the set of anchors further includes the following anchors represented as CMYK vectors: (275, 280, 290, 0), (90, 0, 0, 255), (0, 80, 0, 255), (0, 80, 80, 255), (80, 0, 80, 255), (90, 90, 0, 255), (170, 170, 170, 255).

48. The article of manufacture defined in claim 43 wherein the set of anchors includes one or more of cyan, magenta, and yellow being at any value and black being at least at a predetermined maximum value.

49. The article of manufacture defined in claim 42 wherein instructions executed by the system cause the system to calculate errors by:
 calculating an error by subtracting the anchor for each color plane from a corresponding color plane in the input pixel if the black color plane of the anchor is not at its maximum value; and
 calculating the error as all zeros in all non-black color planes and subtracting the black color plane value in the anchor from the black color plane value in the input pixel when the black color plane in the anchor is at its maximum value.

* * * * *